US011285575B2

(12) United States Patent
Stephenson et al.

(10) Patent No.: US 11,285,575 B2
(45) Date of Patent: Mar. 29, 2022

(54) MINIMUM QUANTITY LUBRICATION TOOL PRIMING METHOD

(71) Applicant: Ford Motor Company, Dearborn, MI (US)

(72) Inventors: David Alan Stephenson, Detroit, MI (US); Ethan Timothy Hughey, Royal Oak, MI (US)

(73) Assignee: Ford Motor Company, Dearborn, MI (US)

( * ) Notice: Subject to any disclaimer, the term of this patent is extended or adjusted under 35 U.S.C. 154(b) by 400 days.

(21) Appl. No.: 16/240,046

(22) Filed: Jan. 4, 2019

(65) Prior Publication Data

US 2020/0215655 A1   Jul. 9, 2020

(51) Int. Cl.
| B23Q 11/10 | (2006.01) |
| F16N 7/32 | (2006.01) |
| B23Q 3/155 | (2006.01) |
| B23Q 17/00 | (2006.01) |
| G05B 19/04 | (2006.01) |

(52) U.S. Cl.
CPC ...... *B23Q 11/1046* (2013.01); *B23Q 3/15503* (2016.11); *B23Q 17/007* (2013.01); *F16N 7/32* (2013.01); *G05B 19/0415* (2013.01); *F16N 2270/20* (2013.01); *G05B 2219/49043* (2013.01); *Y10T 409/304032* (2015.01); *Y10T 483/10* (2015.01); *Y10T 483/12* (2015.01)

(58) Field of Classification Search
CPC ... Y10T 483/12–15; Y10T 409/303976; Y10T 409/304032; Y10T 408/45; Y10T 408/453; Y10T 408/455; Y10T 408/458; G05B 19/0415; G05B 2219/49043; F16N 7/32; F16N 2270/20; B23Q 3/15503; B23Q 11/10–1092; B26D 7/088

USPC ..... 483/4–13; 409/135, 136; 408/57, 58, 59, 408/60; 83/169

See application file for complete search history.

(56) References Cited

U.S. PATENT DOCUMENTS

| 4,809,426 A * | 3/1989 | Takeuchi | B23Q 5/00 365/64 |
| 5,620,746 A | 4/1997 | Snyder, Jr. | |
| 8,545,137 B2 | 10/2013 | Aiso et al. | |
| 9,126,301 B2 * | 9/2015 | Meidar | B23Q 11/1053 |
| 9,931,724 B2 | 4/2018 | Balaji et al. | |
| 2013/0206441 A1 | 8/2013 | Roser et al. | |
| 2016/0361788 A1 * | 12/2016 | Fujii | B23Q 3/1552 |
| 2017/0113315 A1 * | 4/2017 | Bangma | F16N 7/32 |

FOREIGN PATENT DOCUMENTS

| CN | 106625008 | | 5/2017 | | |
| DE | 10132857 A1 * | 1/2003 | ........... B23B 29/046 |
| DE | 10144773 A1 * | 4/2003 | ......... G05B 19/4065 |

(Continued)

*Primary Examiner* — Erica E Cadugan
*Assistant Examiner* — Michael J Vitale
(74) *Attorney, Agent, or Firm* — Burris Law, PLLC

(57) ABSTRACT

A method of priming a minimum quantity lubrication (MQL) tool includes determining a category of the tool, supplying a short-prime MQL dosage if the tool is a first category or if both a second category and lubricated within a first predetermined timeframe, and supplying a long-prime MQL dosage if the tool is the second category and has not been lubricated within the predetermined timeframe. The category is based on internal passage complexity of the tool.

20 Claims, 2 Drawing Sheets

(56) References Cited

FOREIGN PATENT DOCUMENTS

| DE | 102004034689 | | 8/2005 | |
|---|---|---|---|---|
| DE | 102017209822 | A1 * | 12/2018 | ......... B23Q 11/1046 |
| JP | 60104610 | A * | 6/1985 | ............. B23D 33/00 |

* cited by examiner

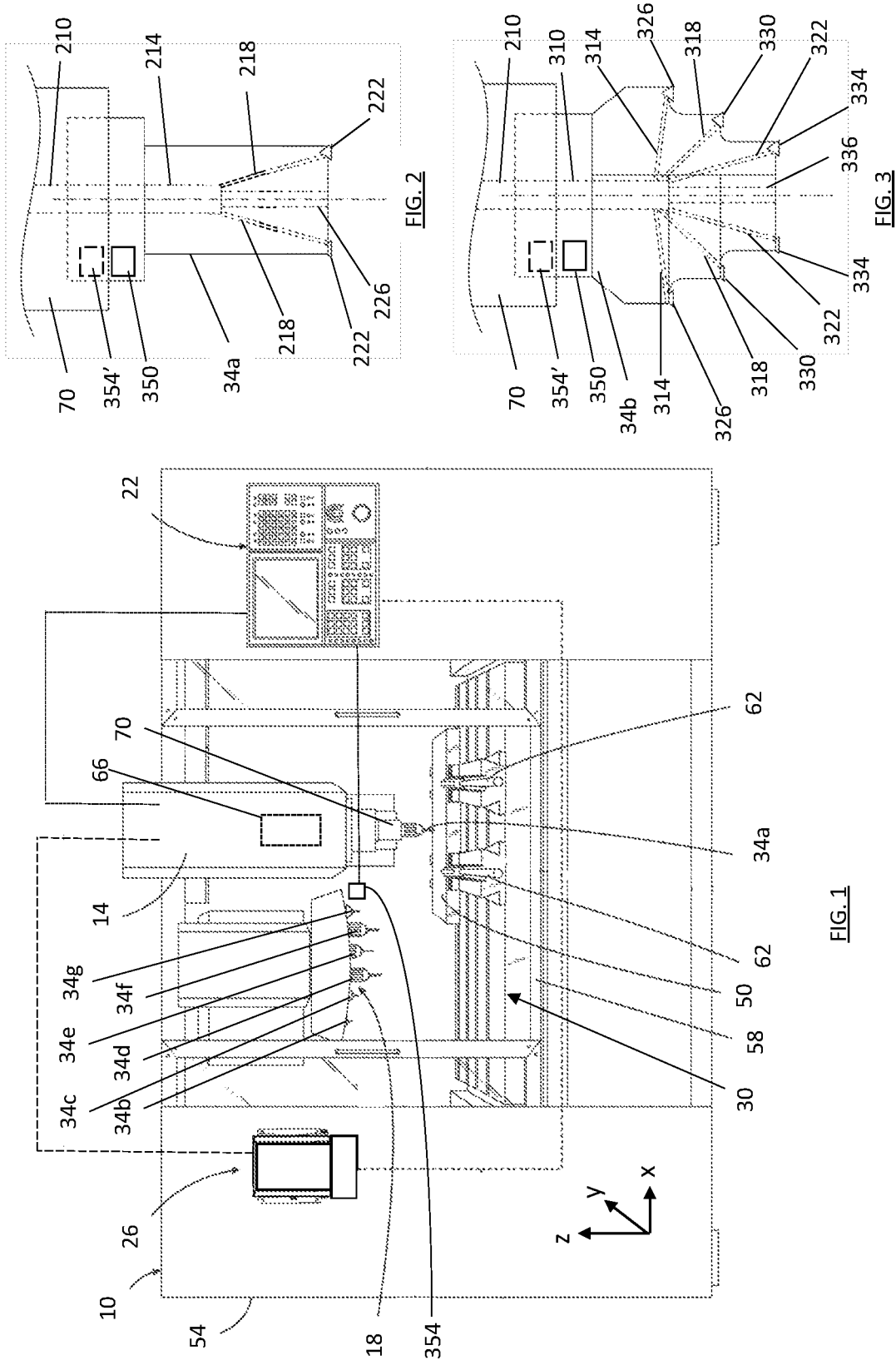

MINIMUM QUANTITY LUBRICATION TOOL PRIMING METHOD

FIELD

The present disclosure relates to high volume machining equipment and more specifically to a method of priming a minimum quantity lubrication tool.

BACKGROUND

The statements in this section merely provide background information related to the present disclosure and may not constitute prior art.

Conventional machining uses high volume flow of a liquid lubricant over the cutting edges of the tool. In contrast, minimum quantity lubrication ("MQL") machining uses lubrication supplied to the cutting edges of a tool through a lean air-oil mist, rather than through the high-volume liquid-based emulsion in conventional machining. The MQL mist typically flows through internal passages of the tool to reach the cutting edges. The surfaces of internal passages of the tooling assemblies must retain residual oil between cycles for the mist to have adequate oil for the start of a machining cycle. Otherwise, the initial volume of oil can end up coating (e.g., "wetting") the internal passage surfaces instead of being expelled and lubricating the cutting edges at the beginning of a machining cycle. This lag time in lubricating the cutting edges can result in dimensional errors and potential tool breakage. To ensure adequate retained oil, tools are typically "baptized" or primed on first use and also after a prescribed period of non-use.

In the typical baptism priming process, oil and air are blown through the assembly for a prescribed time period to coat the oil retaining surfaces of the internal passages of the tool before machining the workpiece. Typically, the baptism priming process is done by priming the tool at the operating flow rate for a minimum of 30 seconds to 1 minute for new tools and 15 seconds to 30 seconds for tools that have not been used for 8 hours. Typically, all MQL tools in a machining device are subject to the same priming cycle regardless of size or complexity of the tool. However, when performing a machining process that includes many tool changes, this typical baptism priming process requires a considerable amount of downtime (e.g., as much as 3.5% of productive hours). Additionally, blowing the oil mist into the machining workspace for prolonged periods leads to cleanliness issues and oily removed material chips that can clog washers and other systems.

The present disclosure addresses these issues associated with traditional MQL tool priming.

SUMMARY

This section provides a general summary of the disclosure and is not a comprehensive disclosure of its full scope or all of its features.

In one form, a method of priming a minimum quantity lubrication (MQL) tool includes determining a category of the tool, supplying a short-prime MQL dosage if the tool is a first category or if both a second category and lubricated within a first predetermined timeframe, and supplying a long-prime MQL dosage if the tool is the second category and has not been lubricated within the predetermined timeframe. The category is based on internal passage complexity of the tool. In a variety of alternate forms of the present disclosure: the short-prime MQL dosage includes an MQL flowrate that is greater than an operating flowrate of the tool and is applied to the tool for less than a time period required to perform a tool change procedure for mounting (i.e., seating) the tool for operation; the method further includes supplying the short-prime MQL dosage during the tool change procedure; the MQL flowrate is between 50 milliliters per hour and 200 milliliters per hour and is applied for less than or equal to 2 seconds; the long-prime MQL dosage includes an MQL flowrate that is greater than an operating flowrate of the tool and is applied to the tool for greater than a time period required to perform a tool change procedure for mounting (i.e., seating) the tool for operation; the MQL flowrate is between 50 milliliters per hour and 200 milliliters per hour and is applied for greater than 2 seconds; the tool is of the first category if the tool has non-complex internal passages and is of the second category if the tool has complex internal passages; the tool is of the first category if the fluid resistance of the tool is below a predetermined resistance, wherein the tool is of the second category if the fluid resistance of the tool is above the predetermined resistance; the category of the tool is predetermined and provided on the tool via an indicator, the method further comprising detecting the indicator, wherein the tool is primed based on the detected indicator; the predetermined timeframe is a first predetermined timeframe and the method further includes determining if the tool has been used within a second predetermined timeframe that is shorter than the first predetermined timeframe, wherein if the tool is the first category and a time period since the tool has been lubricated is greater than the second predetermined timeframe, then the tool is primed with the short-prime MQL dosage, and wherein if the time period since the tool has been lubricated is less than the second predetermined timeframe, then a priming MQL dosage is not supplied to the tool; the predetermined timeframe is a first predetermined timeframe and the method further includes determining if the tool has been used within a second predetermined timeframe that is shorter than the first predetermined timeframe, wherein if the tool is the second category and a time period since the tool has been lubricated is less than the first predetermined timeframe and greater than the second predetermined timeframe, then the tool is primed with the short-prime MQL dosage, and wherein if the time period since the tool has been lubricated is less than the second predetermined timeframe, then a priming MQL dosage is not supplied to the tool.

In another form, a method of priming a minimum quantity lubrication (MQL) tool includes categorizing a plurality of tools as a function of fluid resistance of each tool, determining a next tool to be used, determining a first time period that is since the next tool was lubricated, and priming internal passageways of the next tool with a dosage of MQL mist, the dosage being based on the fluid resistance of the next tool and the first time period. In a variety of alternate forms of the present disclosure: if the fluid resistance of the next tool is below a predetermined resistance, then the dosage includes an MQL flowrate that is greater than an operating flowrate of the next tool and is applied to the next tool while the next tool is positioned for operation and the dosage is applied for a time interval that is less than an amount of time to position the next tool for operation; the MQL flowrate is between 50 milliliters per hour and 200 milliliters per hour and is applied for less than or equal to 2 seconds; if the fluid resistance of the next tool is above a predetermined resistance and the next tool has not been lubricated within a predetermined first time interval, then the dosage includes an MQL flowrate that is greater than an operating flowrate of the next tool and the dosage is applied to the next tool for a time interval that is greater than an amount of time to position the next tool for operation; the MQL flowrate is between 50 milliliters per hour and 200 milliliters per hour and is applied for greater than 2 seconds; if the fluid resistance of the next tool is above the predetermined resistance and the next tool has been lubricated within the predetermined first time interval, then the dosage includes an MQL flowrate that is greater than an operating flowrate of the next tool and the dosage is applied to the next tool for a time interval that is less than the amount of time to position the next tool for operation; he MQL flowrate is between 50 milliliters per hour and 200 milliliters per hour and is applied for less than or equal to 2 seconds; if the next tool has been lubricated within a predetermined second time interval that is shorter than the predetermined first time interval, then the dosage has an MQL flowrate that is zero and the next tool is not primed before the next tool is used for operation; a category of each of the plurality of tools is provided on the tool via an indicator, the method further comprising detecting the indicator, wherein the dosage of MQL mist is based on the detected indicator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a front view of an automated minimum quantity lubrication machining device in accordance with the teachings of the present disclosure;

FIG. 2 is a side view of a cutting tool of a first construction for use in the machining device of FIG. 1;

FIG. 3 is a side view of a cutting tool of a second construction for use in the machining device of FIG. 1.

Figure 4:
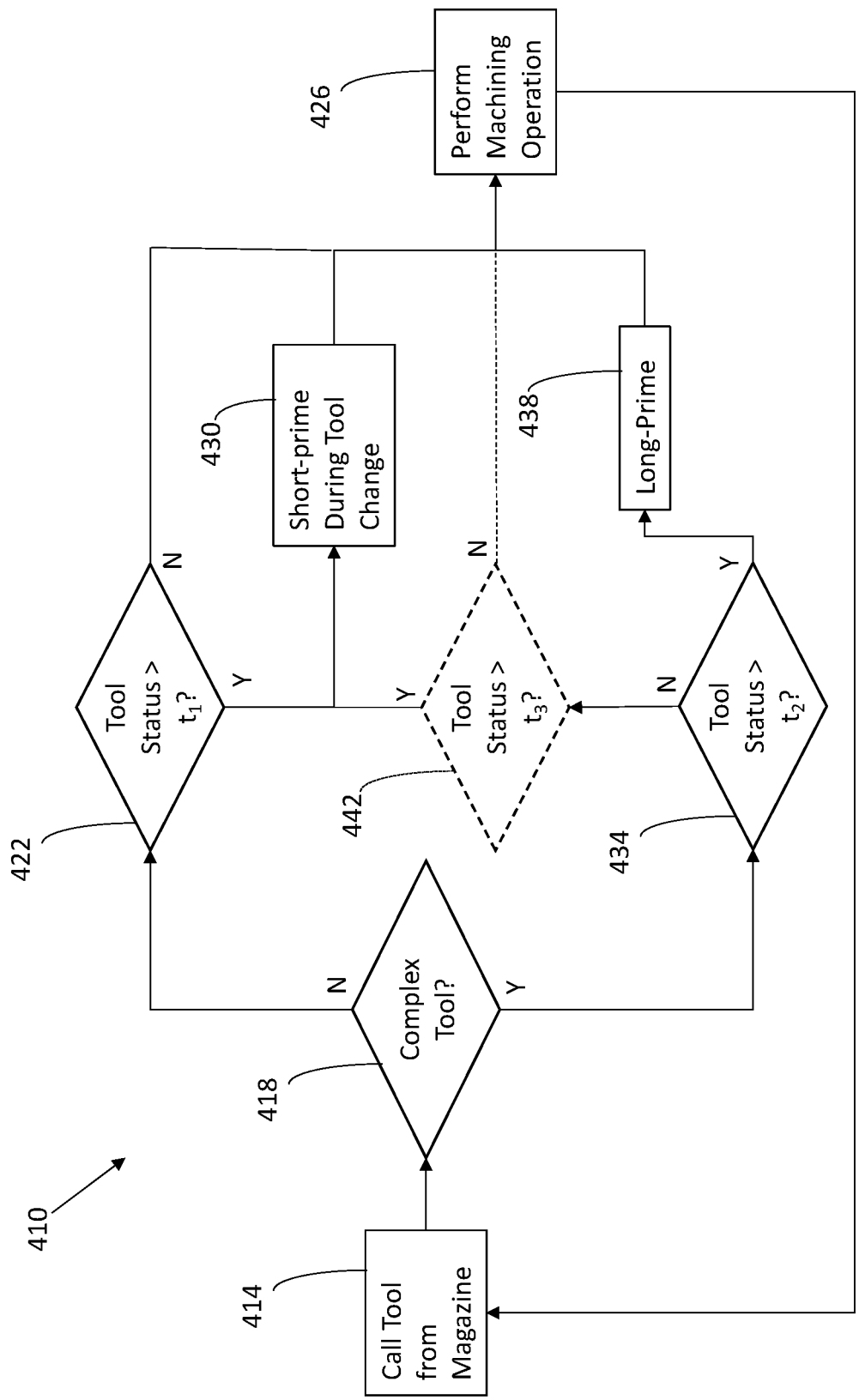
FIG. 4 is a flow chart illustrating a method of operating the machining device of FIG. 1 in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of methods for controlling the machining of parts in a high production environment, which reduce time and oil used during priming of minimum quantity lubrication (MQL) tools. Generally, the teachings of the present disclosure are based on a complexity of a tool and the fluid resistance of its internal passages. The complexity and resistance can be determined based on a resistance of the tool's internal passages as described in U.S. patent application Ser. No. 15/972,624, filed May 7, 2018, which is incorporated herein by reference in its entirety.

Referring now to FIG. 1, an automated MQL device 10 is illustrated. In the example provided, the MQL device is a multi-axis mill, though other types of MQL devices configured with changeable tools can be used (e.g., a lathe or a drill press). The MQL device 10 includes a drive unit 14, a tool magazine 18, a control module 22, a lubrication system 26, a workpiece holding system 30, and a plurality of tools (e.g., tools 34a-34g, referred to in general by reference numeral 34) configured to remove material from a workpiece 50. In the example provided, the MQL device also includes a housing 54. The drive unit 14, tool magazine 18, and workpiece holding system 30 are disposed within the housing 54 so that the workpiece 50 can be machined within the housing 54.

In the example provided, the workpiece holding system 30 includes a table 62 and a plurality of clamps or fixtures 62 configured to support the workpiece 50 on the table 62. In the example provided, the fixtures 62 are configured to hold the workpiece 50 stationary while the drive unit 14 moves, though other configurations can be used. For example, the drive unit 14 may remain stationary while the workpiece holding system 30 moves the workpiece 50, or a combination of movement of the workpiece 50 and the drive unit 14.

The drive unit 14 includes an electric motor 66 and a tool holder 70. The tool holder 70 is configured to hold one of the tools 34 for use in machining the workpiece 50. In the example provided, the motor 66 is configured to rotate the tool holder 70 (e.g., via a gearbox, not specifically shown), to machine the workpiece 50. The drive unit 14 can also be configured to move the tool holder 70 relative to the workpiece 50 along multiple axes, such as along the X-axis, Y-axis, and Z-axis. While the example MQL device 10 is illustrated with the drive unit 14 mounted vertically above the workpiece 50, it is understood that the drive unit 14 can be mounted in any suitable orientation for a machining device, such as horizontally or on the end of a robotic arm (not shown) for example and can also be configured to pivot or rotate on one or more axes to change the orientation relative to the workpiece 50. As such, the particular orientation and size of the drive unit illustrated should not be considered as limiting the scope of the disclosure to a particular configuration of machining device. The control module 22 is in communication with the drive unit 14 to control the orientation of the tool holder 70 and operation of the motor 66 for rotating the tool holder 70.

The lubrication system 26 is coupled to the drive unit 14 for fluid communication with the drive unit 14. The lubrication system 26 is configured to deliver an amount of lubricant fluid and air to the drive unit 14 in proportions such that an MQL mist of air and lubricant fluid is provided to the tool holder 70. In an alternative configuration, not specifically shown, the lubrication system 26 can be coupled to the tool magazine 18 for fluid communication therewith to deliver an amount of MQL mist to one or more of the tools 34 in the tool magazine 18 in order to prime the tool 34 before being mounted to the tool holder 70.

With additional reference to FIG. 2, the tool holder 70 is drivingly coupled to the motor 66 to be rotated by the motor 66 about a central axis of the tool holder 70. The tool holder 70 is configured to removably hold one of the tools 34 for rotation about the axis. The tool holder 70 has an internal passage 210 in fluid communication with the lubrication system 26 and configured to receive the MQL mist therefrom. When one of the tools 34 (e.g., tool 34a shown in FIG. 2) is loaded into the tool holder 70, the internal passage 210 of the tool holder 70 is in fluid communication with internal passages within the tool 34. In the example provided, the internal passage 210 provides lubrication mist to a central main internal passage 214 of the tool 34a. The main internal passage 214 of the tool 34a is in fluid communication with branch passages 218 that are configured to provide lubrication mist to cutting edges 222 and a branch passage 226 that provides lubrication mist to an end of the tool 34a, though other configurations can be used. The tool 34a is an example of a simple, low fluid resistance tool, as described in more detail below. In the example provided, the tool 34a has two cutting edges 222 located to provide a single cutting diameter, though other configurations can be used such as more or fewer cutting edges and/or more or fewer cutting diameters.

Referring to FIG. 3, a tool 34b of a second construction is illustrated. The tool 34b is an example of a more complex tool, having more internal passages and a higher total fluid resistance than the tool 34a. In the example provided, the tool 34b has a central main internal passage 310 configured to receive the lubrication mist from the internal passage 210 of the tool holder 70. The main internal passage 310 is in fluid communication with branch passages 314, 318, 322 that are configured to provide lubrication mist to a plurality of cutting edges 326, 330, 334. In the example provided, the branch passages 314 provide lubrication mist to cutting edges 326 located at a first cutting diameter, the branch passages 318 provide lubrication mist to cutting edges 330 located at a second cutting diameter, and branch passages 322 provide lubrication mist to cutting edges 334 located at a third cutting diameter, though other configurations can be used. In the example provided, a branch passage 336 also provides lubrication mist to an end of the tool 34b, though other configurations can be used. While the tool 34b is illustrated with three cutting diameters and two cutting edges per diameter, more or fewer cutting edges and/or cutting diameters can be used and different internal passage pathways or geometries can be used.

Referring to FIGS. 2 and 3, each tool 34 can optionally also include a tool identifier 350. The tool identifier 350 can be any suitable indication device configured to identify the tool or other characteristics of the tool, such as whether it is classified as a simple or complex tool for example. In one example, the tool identifier is a radio-frequency identification (RFID) tag or a bar code, though other configurations can be used. The tool identifier 350 is configured to be scanned by a scanning device 354 that is in communication with the control module 22.

In one example configuration shown in FIG. 1, the scanning device 354 is mounted within the housing 54 near the tool magazine 18 and positioned to scan a tool 34 that the magazine 18 has positioned for being ready to mount (i.e., seat) on the tool holder 70. Alternatively, the scanning device 354 can move relative to the tool magazine 18 to detect which tool 34 is in which position in the tool magazine 18. In another alternative construction, the scanning device (shown in dashed lines in FIGS. 2 and 3 and indicated by reference numeral 354') can be mounted on the tool holder 70. In another alternative construction, not specifically shown, the scanning device, or an additional scanning device can be located outside the housing 54 and configured to scan a tool 34 to be added to the tool magazine 18 or to be manually seated in the tool holder 70.

The scanning device 354 is configured to send a signal to the control module 22 that indicates which tool 34 is scanned, such as which tool 34 is loaded in the tool holder 70 or which tool 34 is located in a particular location in the tool magazine 18 for example.

Returning to FIG. 1, the tool magazine 18 is configured to hold a plurality of the tools 34 when they are not being used on the workpiece (e.g., when the tools 34 are not mounted to the tool holder 70). Each tool 34 can be configured for a different operation, such as different cutting diameters or profiles for example. The tool magazine 18 can be stationary or can move. The drive unit 14 and the tool magazine 18 are configured to cooperate together to permit the tool holder 70 to automatically eject the tool 34 that is no longer needed from the tool holder 70 and place that tool 34 in a corresponding location in the tool magazine 18. The drive unit 14 and tool magazine 18 can then cooperate to automatically load the next tool 34 to be used into the tool holder 70. In the example provided, the tool holder 70, drive unit 14, and tool magazine 18 are configured to change out the tool 34 for the next tool 34 in approximately two seconds, though other configurations or tool change times can be used.

The control module 22 is in communication with the lubrication system 26 and configured to control operation of the lubrication system 26 including controlling the proportions of the MQL mist (e.g., controlling the flow rate of lubricant fluid). The control module 22 is also in communication with the drive unit 14 to move the tool 34 relative to the workpiece 50. The control module 22 can also be in communication with the tool magazine 18 to control the coordination of the drive unit 14 and the tool magazine 18 to change tools 34 mounted (i.e., seated) in the tool holder 70. The control module 22 is configured to run programs for machining workpieces 50. The control module 22 is configured to receive input from various sensors, such as the scanning device 354 and/or position sensors (not specifically shown) for the drive unit 14, tool holder 70, and/or tool magazine 18. The control module 22 is configured to keep track of times when specific ones of the tools 34 were last used.

Referring to FIG. 4, a method 410 of operating the MQL device 10 is illustrated in flow chart format. The control module 22 is configured to operate the MQL device 10 in accordance with the method 410. At step 414, the control module 22 receives a call or instructions for a specific one of the tools 34 to be loaded next onto the tool holder 70 for use in machining the workpiece 50. The control module can receive this instruction from a program being run corresponding to the workpiece 50. This instruction can include the tool identifier 350, a location in the tool magazine 18, or other identifying information corresponding to the specific tool 34 to be used next. The method continues to step 418.

At step 418, the control module 22 determines whether the specific tool 34 to be used next is a complex tool or a simple tool. In one configuration, the control module 22 can include or have access to a database that references each available tool in the tool magazine 18 as either a complex tool or a simple tool. In another configuration, the tool identifier 350 can specifically identify the tool as either a complex tool or a simple tool. In other words, the actual determination or classification of each tool as either complex or simple can be predetermined and stored in a look-up table or other available format linked to the tool's identifying information. Whether the tool 34 is considered a simple tool or a complex tool can be based on the total fluid resistance (i.e., the equivalent resistance) of all of the internal passages of the tool 34. As described in greater detail in U.S. patent application Ser. No. 15/972,624, the fluid resistance of a particular passage of the tool can be provided by the following equation:

$$R = \rho * \left(\frac{L}{A^n}\right)$$

In the above equation, R is the resistance value of the passage, p is the resistivity value of the passage (e.g., surface roughness), L is the length of the passage, A is the cross-sectional area of the passage, and the power n is equal to 1 or 0.5. The total fluid resistance can then be determined as the equivalent resistance of the tool 34 using the circuit analysis analogy described in more detail in U.S. patent application Ser. No. 15/972,624. Thus, the resistance of the tool 34 can depend on the surface area, volume, and roughness of the internal passages.

Tools with a total fluid resistance above a resistance threshold can be considered complex tools, whereas tools with a total fluid resistance below the resistance threshold can be considered simple tools. In general, if the tool 34 can be fully primed (e.g., fully wetted) by a high flow rate (e.g., 100 mL/hr-200 mL/h) within the time it takes to change tools 34, then the tool 34 is considered a simple tool. In one configuration, the tool 34 can be considered fully primed if the rate of MQL mist entering the tool 34 equals the rate of MQL mist exiting the tool 34.

Returning to the method 410, if the tool 34 to be used next is classified as a simple tool, then the method continues to step 422.

At step 422, the control module 22 checks the status of the tool 34 to be used next. In the example provided, the control module 22 checks when the last time the tool 34 to be used next was used. If the time since the last use is less than a first predetermined time limit $t_1$, then the method continues to step 426.

At step 426, the control module 22 operates the drive unit 14 and tool magazine 18 to load the tool 34 into the tool holder 70 and then performs a desired machining operation to the workpiece 50 without priming the tool with MQL lubrication before machining the workpiece 50. It is understood that the lubrication system 26 still provides MQL lubrication to the tool 34 during the machining of the workpiece. However, the first predetermined time limit $t_1$ corresponds to a maximum time period in which the internal passages of the tool 34 are still coated (e.g., primed) from the previous use of that tool 34. In one non-limiting example, the first predetermined time limit $t_1$ can be approximately 3 hours, though other times can be used. After step 426, the method can end, or the program can call a new tool 34 to be loaded from the tool magazine 18 and return to step 414.

Returning to step 422, if the tool 34 to be used next has not been used within the first predetermined time limit $t_1$ (i.e., the time since the tool 34 was last used is greater than $t_1$), then the method proceeds to step 430.

At step 430, the control module 22 operates the lubrication system 26 to prime the tool according to a predetermined short-prime program. The short-prime program is configured to prime the tool 34 within the time that it takes to load the tool 34 in the tool holder 70 so that machining of the workpiece 50 is not delayed while the tool 34 is primed. In one example, the short-prime program can prime the tool 34 while the tool 34 is still in the tool magazine 18 during the time it takes the tool holder 70 to move into position to retrieve the tool 34 from the tool magazine 18. In another example, the short-prime program can prime the tool 34 while the tool 34 is loaded in the tool holder 70, but during the time that it takes the tool holder 70 to move from the tool magazine 18 and into position relative to the workpiece 50.

Generally, the short-prime program operates the lubrication system 26 to provide an MQL lubricant fluid dosage at a rate between 50 milliliters per hour and 200 milliliters per hour for a time of 2 seconds or less. In one non-limiting example, the short-prime program operates the lubrication system 26 to provide MQL lubricant fluid at a rate of 100 milliliters per hour for a duration of approximately 2 seconds, though other configurations can be used. In this example, it takes the device 2 seconds or greater to change tools 34 loaded in the tool holder 70. In another non-limiting example, the flow rate can be 200 milliliters per hour for a duration of approximately 1 second. The flow rate of MQL lubricant fluid during the short-prime program is considerably greater than the standard operating flow rate for the selected tool 34. The standard operating flow rate for MQL lubricant fluid for the tool 34 of these examples can be approximately 50 milliliters per hour or less. After priming the tool 34 according to the short-prime program, the method 410 proceeds to step 426 to machine the workpiece 50.

In an alternative configuration, not specifically shown, step 422 can be omitted and the method 410 can proceed directly from step 418 to step 430 if the tool 34 is determined to be a simple tool. In other words, all simple tools can receive the short-prime during tool change.

Returning to step 418 of the example provided, if the control module 22 determines that the tool 34 to be used next is classified as a complex tool (i.e., high fluid resistance tool), then the method 410 proceeds to step 434.

At step 434, the control module 22 checks the status of the tool 34 to be used next. In the example provided, the control module 22 checks when the last time the tool 34 to be used next was used. If the time since the last use is greater than a second predetermined time limit $t_2$ (i.e., the tool 34 has not been used in at least $t_2$), then the method continues to step 438. The second predetermined time limit $t_2$ is longer than the first predetermined time limit $t_1$. In the example provided, the second predetermined time limit $t_2$ is approximately 8 hours, though other times can be used. For example, the second predetermined time limit $t_2$ can correspond to the time it generally takes for most or all of the lubricant fluid to drain from the tool 34 or the time for the internal passages of the tool 34 to otherwise dry out.

At step 438, the control module 22 operates the lubrication system 26 to prime the tool according to a predetermined long-prime program. The long-prime program is configured to prime the complex tool 34 to be used next. In one example, the long-prime program can be an MQL dosage specific to the tool 34, such that different complex tools 34 have different long-prime MQL dosage programs that correspond to the flow rate and time durations needed to prime that specific complex tool 34. In another example, the long-prime program can be generic to all complex tools 34 available in the tool magazine 18. In one example, the long-prime program can prime the tool 34 while the tool 34 is still in the tool magazine 18. In another example, the short-prime program can prime the tool 34 while the tool 34 is loaded in the tool holder 70.

In one non-limiting example, the long-prime program operates the lubrication system 26 to provide MQL lubricant fluid at a rate of 100 milliliters per hour for a duration that is based on the fluid resistance of the tool 34 but is longer than the time needed to change tools 34. In another non-limiting example, the flow rate can be 200 milliliters per hour for a duration that is based on the fluid resistance of the tool 34 but is longer than the time needed to change tools 34. The flow rate of MQL lubricant fluid during the long-prime program is considerably greater than the standard operating flow rate for the selected tool 34 and can be similar to the flow rate of the short-prime program but applied for a longer time. After priming the tool 34 according to the long-prime program, the method 410 proceeds to step 426 to machine the workpiece 50.

Returning to step 434, if the time since the last use of the complex tool 34 is less than the second predetermined time limit $t_2$ (i.e., the tool has been used within $t_2$), then the method 410 proceeds directly to step 430 as described above. In this particular example, the method 410 does not include optional step 442 shown in dashed lines. Thus, complex tools 34 that have been used within the second predetermined time limit $t_2$ are primed according to the short-prime program during the tool change.

In an alternative configuration, if the time since the last use of the complex tool 34 is less than the second predetermined time limit $t_2$ (i.e., the tool has been used within $t_2$), then the method 410 does not proceed directly to step 430. Instead, the method 410 proceeds to step 442.

At step 442, the control module 22 checks if the complex tool 34 has been used within a third predetermined time limit $t_3$, which is less than $t_2$. In one example, the $t_3$ is equal to $t_1$. In another example, $t_3$ is different from $t_1$. If the complex tool 34 has not been used in the third predetermined time limit $t_3$ (i.e., the time since last use is greater than $t_3$), then the method 410 proceeds to step 430, as described above, to prime the complex tool 34 according to the short-prime program during the tool change. However, if the complex tool 34 has been used within the third predetermined time $t_3$ (i.e., the time since last use is less than $t_3$), then the method proceeds to step 426 to machine the part without priming the tool 34.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof.

The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of priming a minimum quantity lubrication (MQL) tool comprising:
   determining a category of the tool, the category being based on internal passage complexity of the tool;
   controlling, via a control module, a supply of priming lubrication to the tool, wherein the control module is configured to:
      supply a short-prime MQL dosage if a first set of conditions is met or if a second set of conditions is met, wherein the short-prime MQL dosage is applied to the tool for less than a time period required to perform a tool change procedure for mounting the tool for operation, wherein the first set of conditions includes the tool being a first category of tool, wherein the second set of conditions includes the tool being a second category of tool and the tool having been lubricated within a first predetermined timeframe; and
      supply a long-prime MQL dosage if the tool is the second category of tool and has not been lubricated within the first predetermined timeframe, wherein the long-prime MQL dosage is a dosage of MQL that is applied to the tool for more time than the short-prime MQL dosage.

2. The method according to claim 1, wherein the short-prime MQL dosage includes an MQL flowrate that is greater than an operating flowrate of the tool.

3. The method according to claim 2, further comprising supplying the short-prime MQL dosage during the tool change procedure.

4. The method according to claim 2, wherein the MQL flowrate is between 50 milliliters per hour and 200 milliliters per hour and is applied for less than or equal to 2 seconds.

5. The method according to claim 1, wherein the long-prime MQL dosage includes an MQL flowrate that is greater than an operating flowrate of the tool and is applied to the tool for greater than the time period required to perform the tool change procedure for mounting the tool for operation.

6. The method according to claim 5, wherein the MQL flowrate is between 50 milliliters per hour and 200 milliliters per hour and is applied for greater than 2 seconds.

7. The method according to claim 1, wherein the tool is of the first category of tool if the fluid resistance of the tool is below a predetermined resistance, wherein the tool is of the second category of tool if the fluid resistance of the tool is above the predetermined resistance.

8. The method according to claim 1, wherein the category of the tool is predetermined and provided on the tool via an indicator, the method further comprising detecting the indicator, wherein the tool is primed based on the detected indicator.

9. The method according to claim 1 further comprising:
determining if the tool has been used within a second predetermined timeframe that is shorter than the first predetermined timeframe,
wherein the first set of conditions further includes a time period since the tool has been lubricated being greater than the second predetermined timeframe, and
wherein the control module is further configured to perform the operation with the tool without providing priming lubrication to the tool before performing the operation if the time period since the tool has been lubricated is less than the second predetermined timeframe.

10. The method according to claim 1 further comprising:
determining if the tool has been used within a second predetermined timeframe that is shorter than the first predetermined timeframe,
wherein the second set of conditions further includes a time period since the tool has been lubricated being greater than the second predetermined timeframe, and
wherein the control module is further configured to perform the operation with the tool without providing priming lubrication to the tool before performing the operation if the time period since the tool has been lubricated is less than the second predetermined timeframe.

11. A method of priming a minimum quantity lubrication (MQL) tool comprising:
categorizing each tool of a plurality of tools as a function of fluid resistance of each tool;
determining a next tool to be used, the next tool being one tool of the plurality of tools;
determining a first time period that is since the next tool was last lubricated;
controlling, via a control module, a supply of priming MQL mist provided to internal passageways of the next tool, the control module being configured to:
compare the first time period to a predetermined first time interval, and supply a dosage of priming MQL mist at a flowrate that is greater than an operating flowrate of the next tool for a time interval that is less than an amount of time needed to move the next tool from a tool magazine into a position relative to a workpiece for operation in response to the fluid resistance of the next tool being below a predetermined resistance and the next tool not having been last lubricated within the predetermined first time interval; or
compare the first time period to a predetermined second time interval, and supply a dosage of priming MQL mist at a flowrate that is greater than the operating flow rate of the next tool for a time interval that is greater than the amount of time needed to exchange a tool of the plurality of tools for the next tool in response to the fluid resistance of the next tool being above the predetermined resistance and the next tool not having been last lubricated within the predetermined second time interval; or
compare the first time period to the predetermined second time interval, and supply a dosage of priming MQL mist at a flowrate that is greater than the operating flowrate of the next tool for the time interval that is less than the amount of time needed to move the next tool from the tool magazine into the position relative to the workpiece for operation in response to the fluid resistance of the next tool being above the predetermined resistance and the next tool having been last lubricated within the predetermined second time interval.

12. The method according to claim 11, wherein the fluid resistance of the next tool is below the predetermined resistance and the next tool has not been lubricated within the predetermined first time interval, and the method includes controlling, via the control module, the supply of priming MQL mist to supply the dosage at the flowrate that is greater than the operating flowrate of the next tool for the time interval that is less than the amount of time needed to move the next tool from the tool magazine into the position relative to the workpiece for operation, while the next tool is being moved into the position for operation.

13. The method according to claim 12, wherein the MQL flowrate is between 50 milliliters per hour and 200 milliliters per hour and is applied for less than or equal to 2 seconds.

14. The method according to claim 11, wherein the fluid resistance of the next tool is above the predetermined resistance and the next tool has not been lubricated within the predetermined second time interval, and the method includes controlling, via the control module, the supply of priming MQL mist to supply the dosage at the flowrate that is greater than the operating flowrate of the next tool and for the time interval that is greater than the amount of time needed to exchange the tool of the plurality of tools for the next tool, while the next tool is loaded in a tool holder.

15. The method according to claim 14, wherein the MQL flowrate is between 50 milliliters per hour and 200 milliliters per hour and is applied for greater than 2 seconds.

16. The method according to claim 11, wherein the fluid resistance of the next tool is above the predetermined resistance and the next tool has been lubricated within the predetermined second time interval, and the method includes controlling, via the control module, the supply of priming MQL mist to supply the dosage at the MQL flowrate that is greater than the operating flowrate of the next tool and for the time interval that is less than the amount of time needed to move the next tool from the tool magazine into the position relative to a workpiece for operation, while the next tool is being moved into the position for operation.

17. The method according to claim 16, wherein the MQL flowrate is between 50 milliliters per hour and 200 milliliters per hour and is applied for less than or equal to 2 seconds.

18. The method according to claim 11, wherein the control module is further configured to control the supply of priming MQL mist to be at a flowrate of zero to not prime the internal passageways of the next tool before the next tool is used for operation in response to the next tool having last been lubricated within the first time period, which is shorter than the predetermined first time interval.

19. The method according to claim 11, wherein a category of each of the plurality of tools is provided on the tool via an indicator, the method further comprising detecting the indicator, wherein the dosage of MQL mist is based on the detected indicator.

20. A method of priming a minimum quantity lubrication (MQL) tool comprising:
categorizing each tool of a plurality of tools as a function of fluid resistance of each tool, wherein each tool of the plurality of tools has been previously lubricated at least once;
determining a next tool to be used, the next tool being one tool of the plurality of tools;

determining a first time period that is since the next tool was last lubricated;
priming internal passageways of the next tool with a dosage of MQL mist, the dosage being based on the fluid resistance of the next tool and the first time period, wherein if the fluid resistance of the next tool is below a predetermined resistance, then the dosage includes an MQL flowrate that is greater than an operating flowrate of the next tool and the dosage is applied for a time interval that is less than an amount of time to position the next tool for operation.

* * * * *